United States Patent
Knoepfle et al.

(10) Patent No.: US 10,023,032 B2
(45) Date of Patent: Jul. 17, 2018

(54) VEHICLE HAVING A SLIDER FOR GUIDING A DISPLACEABLE ELEMENT

(71) Applicant: Webasto SE, Stockdorf (DE)

(72) Inventors: Julian Knoepfle, Stockdorf (DE); Peter Reihl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/028,179

(22) PCT Filed: Dec. 10, 2015

(86) PCT No.: PCT/EP2015/079306
§ 371 (c)(1),
(2) Date: Apr. 8, 2016

(87) PCT Pub. No.: WO2016/092039
PCT Pub. Date: Jun. 16, 2016

(65) Prior Publication Data
US 2017/0267076 A1    Sep. 21, 2017

(30) Foreign Application Priority Data
Dec. 12, 2014 (DE) .......................... 10 2014 018 285

(51) Int. Cl.
*B60J 7/04* (2006.01)
*B60J 7/043* (2006.01)
*B60J 7/047* (2006.01)

(52) U.S. Cl.
CPC ............... *B60J 7/04* (2013.01); *B60J 7/0435* (2013.01)

(58) Field of Classification Search
CPC .................................. B60J 7/0435; B60J 7/04
USPC ..................................... 296/216.01–224, 214
See application file for complete search history.

(56) References Cited

U.S. PATENT DOCUMENTS

| | | | | |
|---|---|---|---|---|
| 8,388,051 B2* | 3/2013 | Faerber | ................... | B60J 7/024 296/216.08 |
| 8,857,903 B2* | 10/2014 | Nellen | ..................... | B60J 7/024 296/216.03 |
| 2012/0193944 A1* | 8/2012 | Sawada | ................. | B60J 7/0435 296/216.04 |

(Continued)

FOREIGN PATENT DOCUMENTS

DE         38 17 391 A1     12/1998
DE   20 2008 007938 U1      8/2008

(Continued)

OTHER PUBLICATIONS

International Search Report for PCT/EP2015/079306 dated Jan. 21, 2016.

(Continued)

*Primary Examiner* — Dennis H Pedder
(74) *Attorney, Agent, or Firm* — Fitch, Even, Tabin & Flannery, LLP

(57) ABSTRACT

A vehicle having a slider for guiding a displaceable element of the vehicle relative to a body of the vehicle, wherein the slider can be arranged so as to be movable along a guide element, and has a plastics region and a metal region. The slider may be embodied in one piece, wherein the metal region is at least partially overmolded with the plastics region. The slider may be configured such that at least one portion of the slider engages at least partially around the guide element.

13 Claims, 5 Drawing Sheets

(56) References Cited

U.S. PATENT DOCUMENTS

2014/0306492 A1* 10/2014 Heidan .................. B60J 7/024
  296/216.03

FOREIGN PATENT DOCUMENTS

| DE | 10 2008 017526 B3 |   | 9/2009 |
|----|-------------------|---|--------|
| DE | 102008017526      | * | 9/2009 |
| EP | 1 777 090 A2      |   | 4/2007 |
| EP | 2 554 415 A1      |   | 2/2013 |
| FR | 2 978 380 A1      |   | 2/2013 |
| GB | 1462650           | * | 1/1977 |
| JP | S59150621 A       |   | 8/1984 |
| JP | 2002512914 A      |   | 5/2002 |
| JP | 2005186901 A      |   | 7/2005 |
| JP | 2013216236 A      |   | 10/2013 |

OTHER PUBLICATIONS

Written Opinion of the International Searching Authority for PCT/EP2015/079306 dated Jan. 21, 2016.

* cited by examiner

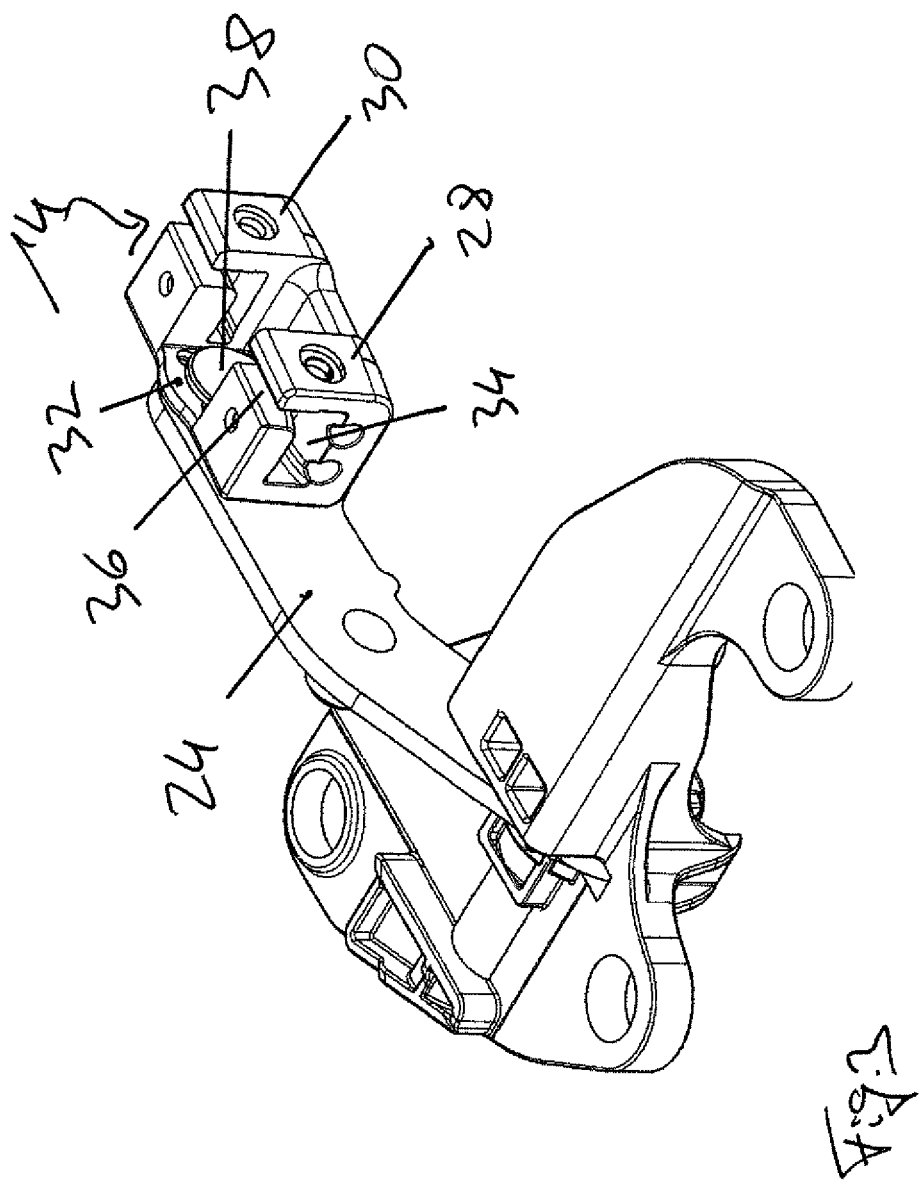

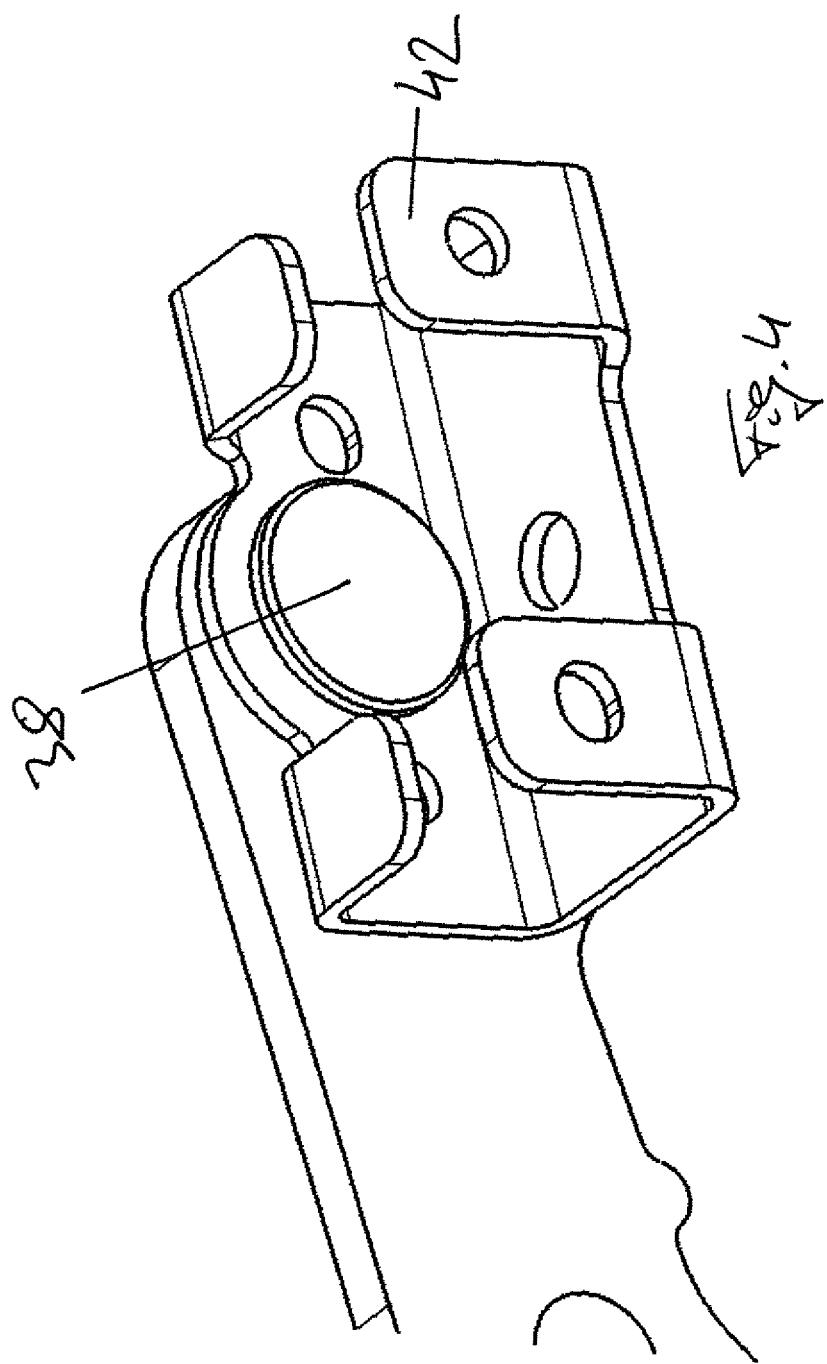

VEHICLE HAVING A SLIDER FOR GUIDING A DISPLACEABLE ELEMENT

CROSS-REFERENCE TO RELATED APPLICATIONS

This application is a U.S. national phase application filed under 35 U.S.C. § 371 of International Application No. PCT/EP2015/079306, filed Dec. 10, 2015, designating the United States, which claims priority from German Patent Application No. 10 2014 018 285.1, filed Dec. 12, 2014, which are hereby incorporated herein by reference in their entirety for all purposes.

FIELD

The present invention relates to a vehicle as per the preamble of claim 1 and to a slider as per the preamble of claim 11.

BACKGROUND

A generic vehicle and a generic slider are known from EP 1 285 796 A1. In this known prior art, a cover element for optionally opening and closing a roof opening in a vehicle roof is arranged in a displaceable manner on the vehicle. In order that the cover can be moved relative to the vehicle, provision is made of a slider by means of which the cover is arranged so as to be movable together with the slider along a guide element in the form of a guide rail. The slider is in this case embodied in a multipiece manner and has several individual parts made of plastics material and metal. A multipiece slider is also known from DE 10 2008 017 526 B3. Since, in such sliders, several parts are assembled to form a slider, high tooling and installation costs arise. Multipiece sliders can furthermore cause disturbing noise, in particular when the individual parts are displaced with respect to one another. Moreover, relatively large tolerances have to be compensated in known sliders in that individual parts of the slider can be displaced with respect to one another. This has the drawback that, in addition to the points addressed above relating to the costs incurred, the compensation of tolerances can be realized only via complex solutions.

It is the object of the present invention to create a vehicle having a slider, or such a slider, in which the abovementioned drawbacks are overcome.

SUMMARY

This object is achieved by a vehicle as per the characterizing part of claim 1 and by a slider as per the characterizing part of claim 11.

According to the invention, the slider is embodied in one piece, wherein a metal region of the slider is at least partially or entirely overmolded with a plastics region.

The slider according to the invention is furthermore configured such that at least one portion of the slider engages at least partially around the guide element.

This has the advantage of producing a one-piece slider, the production of which is particularly cost-effective, and the mounting of which is particularly simple. As a result of the one-piece embodiment of two components connected together, the properties of the slide can be adapted optimally to the application. Thus, as a result of the choice of an appropriate plastics material (for example POM), the sliding property of the slider can be improved and the occurrence of disturbing noise during the moving of the slider can be suppressed. Through an appropriate choice of the material and the shape of the second component, the metal region, in particular the stability of the slider can be set optimally. This means not only that the slider is stable enough to absorb the resulting forces, but also the stability or elasticity thereof can be set such that a tolerance range is covered via appropriate elastic deformation of the metal region and, together therewith, the slider as a whole. Such tolerances can be necessary when the slider is intended to be displaced along a curved path. A slider that is elastically deformable to such an extent can also receive a guide portion of a guide element, said guide portion having a greater thickness than an associated opening in the slide, i.e. is oversized, in order to avoid play. In the case of a slider according to the invention, by setting the elastic deformability of the slider in an appropriate manner, said elastic deformability being defined in particular via the metal region of the slider, provision can be made for the slider to be able to be adapted to such curvatures. This prevents the need for large tolerances to be provided in the slider, as is the case in known sliders, in order to overcome such curvatures, these tolerances resulting in undesired play between the slider and guide element. In other words, in a slider according to the invention, the elastic deformability of the metal region of said slider can thus be set optimally for the corresponding application, i.e. in particular for provided curvatures and/or for a provided oversize of an associated guide element, via the material thickness and via the shape of the metal region. The plastics region of the slider, which at least partially, preferably entirely, surrounds the metal region and is molded onto the latter, can further improve the sliding properties of the slider separately from said metal region.

Preferred embodiments of the invention can be gathered from the dependent claims.

In a particularly preferred embodiment of the invention, the metal region is configured as a spring-steel insert which is at least partially overmolded with the plastics region. The use of a spring-steel material for the metal region further develops the abovementioned advantages. This ensures that the metal region of the slider and thus the slider as a whole is deformed merely elastically rather than plastically. Thus, the slider can overcome a curvature of an associated guide element without jamming occurring. Play between the slider and the associated guide element or the provision of several rotation axes or movable parts within the slider is thus unnecessary. The guide element can furthermore or alternatively be dimensioned such that it elastically expands the metal region in order to prevent play.

Preferably, the guide element is oriented substantially in a direction parallel to the vehicle longitudinal axis and has a guide portion which has a cross section transversely to the vehicle longitudinal axis, wherein the slider has a through-opening corresponding to the cross section, said through-opening being configured to receive the guide portion. The slider is in this case displaceable along the guide element in the direction parallel to the vehicle longitudinal axis and relative to the guide portion and can guide or be guided by the latter. In this case, both the plastics region and the metal region can have a corresponding L-shaped through-opening. For mounting, the guide portion can be introduced into the slider and is then secured against releasing from the guide portion. The cross section of the guide portion and of the opening is preferably L-shaped or U-shaped.

In a further embodiment of the invention, the slider has at least one portion which encloses an opening transversely to the vehicle longitudinal axis except for a slot, wherein the opening and the slot are configured to receive a guide portion of the guide element in that the guide portion can engage in the opening through the slot. The engagement is secured against releasing in that the guide portion is wider than the slot in the region of the opening such that the slider is displaceable along the guide element in the direction parallel to the vehicle longitudinal axis and relative to the guide portion. The slider can have two such portions, which are arranged in succession in the direction of the vehicle longitudinal axis, and a fastening region arranged between these portions, a fastening pin being arranged at said fastening region in order to mount the slider in a pivotable manner about a first rotation axis which is oriented transversely to the vehicle longitudinal axis. This affords the advantage that the slider can be pivoted and can thus follow a curvature of the guide element even better.

The fastening pin is preferably plugged through an opening in the fastening region and is secured against releasing of the fastening in that a securing means preferably in the form of a wobble-type securing means is arranged behind the opening on the plugged-through end of the fastening pin. This affords particularly simple and stable mounting of the slider.

An embodiment in which the metal region is overmolded entirely with the plastics region is particularly preferred. This provides for example the best protection against noise generation. In this case, openings can be provided through the plastics region, in order to make the metal region accessible for fastening means (such as screws) or tools for mounting.

In a further particularly preferred embodiment of the invention, the displaceable element is a cover for optionally opening and closing an opening in a roof of the vehicle. The guide element is arranged on the cover and the slider on a tilt lever which can be pivoted about a second rotation axis that is oriented transversely to the vehicle longitudinal axis. The cover can be lifted in the region of a cover rear edge by deployment of the tilt lever during a movement of the cover toward the rear over a roof surface of the roof, wherein, during the movement of the cover relative to the roof opening, the guide element is moved relative to the slider and is guided by the latter.

In a further particularly preferred embodiment of the invention, the plastics region of the slider has a contact region which is provided for engagement with the guide element. This contact region is configured in a bulged manner, wherein the bulge is configured such that the slide can follow radii of curvature of the guide element. The curvature of a guide element is then overcome primarily by the shape of the contact region without jamming. The elasticity of the slider and the metal region thereof, made for example of spring steel, has only secondary importance therefore. The spring steel then primarily only needs to compensate the tolerances of the guide element. As a result of the use of a spring steel for the metal region of a slider, the opening dimension of the slider can furthermore be selected to be smaller than the dimension of the guide element around which it engages, thereby ensuring play-free guidance.

BRIEF DESCRIPTIONS OF THE DRAWINGS

The invention is explained in more detail by way of example in the following text with reference to the appended figure, in which:

FIGS. 2 and 3 show the slider from FIG. 1;

FIG. 4 shows the metal region of the slider from FIGS. 1 to 3 without the plastics region; and FIG. 5 shows a longitudinal section through the slider from FIG. 1.

DETAILED DESCRIPTION

Figure 1:
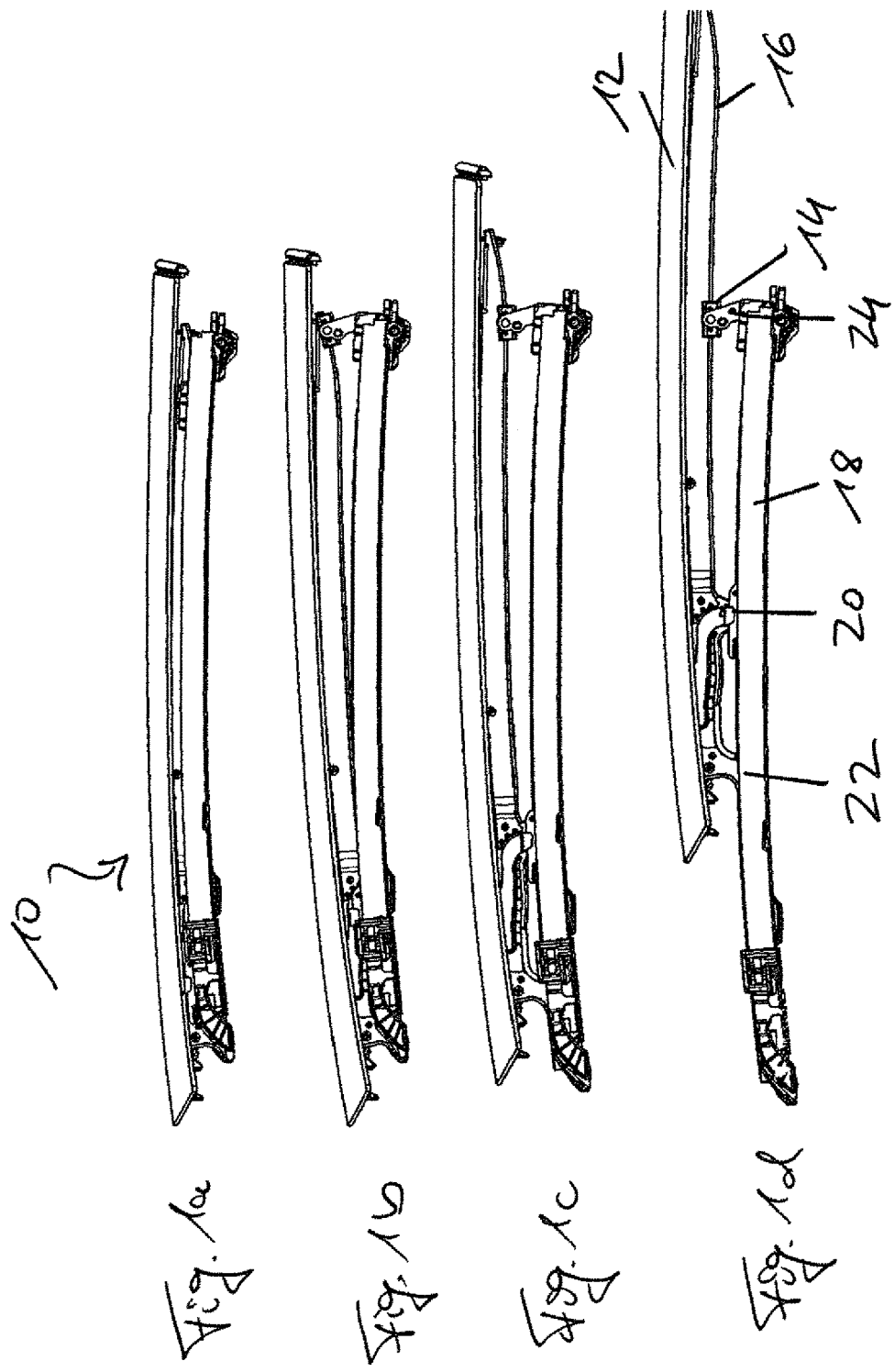
FIG. 1 shows, by means of depictions 1a to 1b, the movement sequence of a cover of a sunroof arrangement from a closed state to an open state of the sunroof arrangement, wherein the sunroof arrangement has a slider according to the invention.

FIG. 1 shows a sunroof arrangement 10 for a vehicle (not shown in more detail). The sunroof arrangement has a displaceable cover 12 which is configured for optionally opening and closing an opening in the vehicle in a roof of the vehicle. To this end, the cover 12 can be displaced along a slider 14 toward the rear in the direction of travel, to the right in FIG. 1, in order to uncover the roof opening. FIG. 1 is subdivided into four depictions 1a to 1d, which show the movement sequence of the cover 12 from the first position in FIG. 1a, in which the cover 12 closes the associated opening the vehicle roof, to FIG. 1d, in which the cover 12 largely uncovers the opening and has been moved toward the rear in the direction of travel. In order that opening and displacement of the cover 12 toward the rear can take place, the cover has to be lifted above adjacent regions of the vehicle roof. This takes place by the cover 12 being lifted first of all in the region of its rear edge (FIG. 1b). After the initial lifting of the cover rear edge, the cover 12 is moved toward the rear (FIG. 1c) and in the process lifted even further in the rear region and now also in the region of the cover front edge (FIG. 1c) and, until the fully deployed position is reached (FIG. 1d), is displaced toward the rear until it reaches the end position in FIG. 1d. To this end, the cover 12 is supported via further sliders 20 and 22 so as to be movable along a guide rail 18 arranged in a manner fixed to the roof. The slider 14 according to the invention is arranged on a tilt lever 24. This tilt lever 24 is pivoted toward the rear while the vehicle roof is being opened, i.e. during the displacement of the cover 12 toward the rear in the direction of travel, and in the process is raised (see for example FIG. 1d), with the result that it moves the cover rear edge upward. The slider 14 comprises a guide element 16 which is arranged on the cover 12. The cover 12 is thus not only supported by the sliders 20 and 22 but is also supported via the slider 14, where the latter lifts the cover rear edge above adjacent regions of the vehicle roof. In the rear region of the cover 12, the guide element 16 extends upward, i.e. away from the vehicle roof. This shaping of the guide element 16 serves as a slotted guide and effects the desired lifting of the cover rear edge. The deployment or pivoting of the tilt lever 24 from the substantially horizontal first position in FIG. 1a to the substantially upright position in FIG. 1d can in this case be effected by the movement of the cover 12 itself (for example via the interaction of the guide element with the slider 12, or by means of a carrier) or via a separate drive, which can be coupled to the drive of the cover 12. The slider 14 has an inner metal region (not visible in FIGS. 1 to 3), which is overmolded with the visible outer plastics region 40. The inner metal region thus forms a supporting core of the slider 12.

Figure 2:
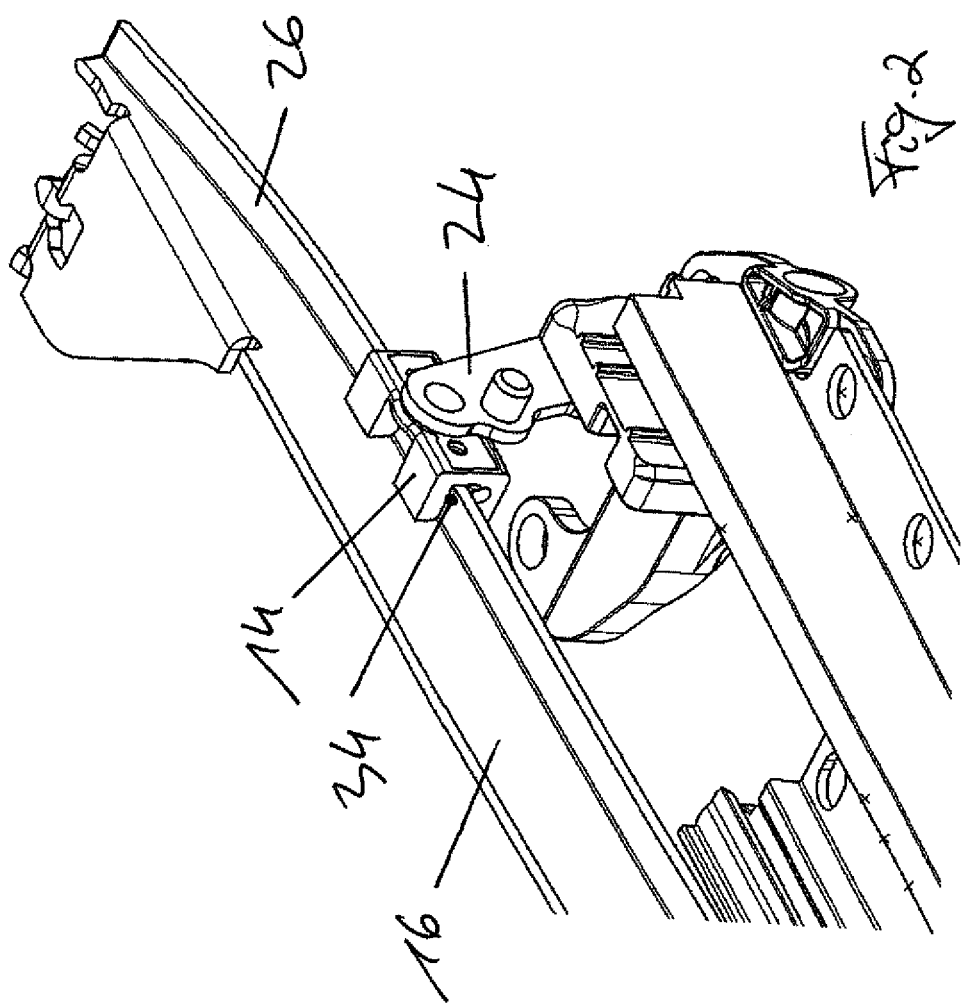
Figure 6:
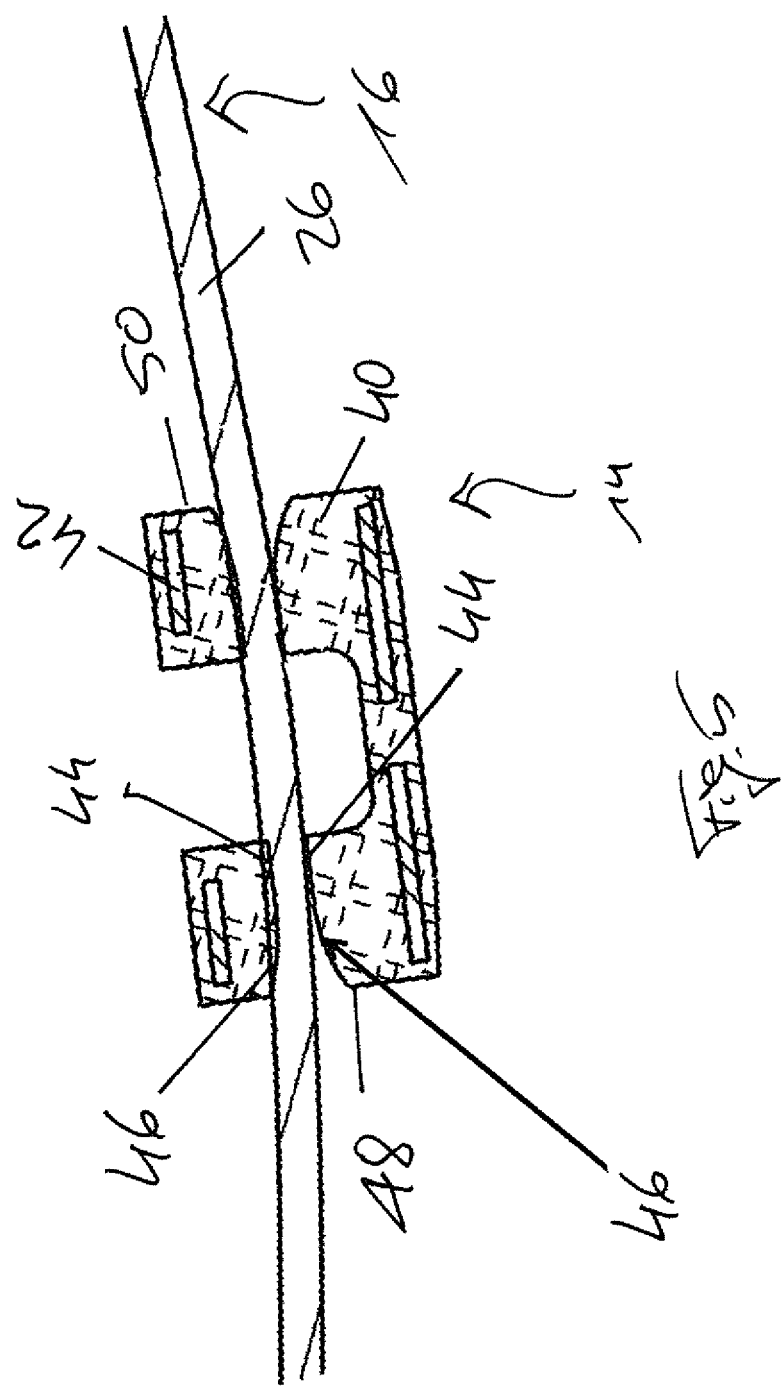

In FIG. 2, the guide element 16 and the associated slider 14 from FIG. 1 are illustrated in an enlarged manner. As already explained, the slider 14 is arranged on the tilt lever 24. In the depiction in FIG. 2, the tilt lever 24 is illustrated in a position already pivoted toward the rear in the direction of travel. Thus, the cover 12 (not illustrated in FIG. 2) has already been partially or fully lifted in the region of its rear edge (see FIGS. 1b to 1d as appropriate). FIG. 2 reveals that the slider 14 engages partially around a guide portion 26 of the guide element 16. The guide portion 26 is in this case configured together with an adjacent region of the guide element 16 such that an L shape arises overall. The slider 14 has a corresponding L-shaped opening 34 such that it can receive the L shape of the guide portion 26. The guide portion 26 passes here into the opening 34 in the slider 14 and engages partially behind the slider 14 such that, although the slider 14 is movable along the guide element 16 in the direction of travel, the slider 14 is prevented from releasing from the guide element 16 by being engaged behind. For mounting, the guide portion 26 of the guide element 16 is therefore inserted into the slider 14 from the rear or the front.

The slider 14 according to the invention from FIG. 2 is explained in more detail with reference to FIG. 3. The slider 14 is in this case depicted without the associated guide element 16 from FIG. 2. The slider 14 has a preferably rectangular opening 34, which, together with a slot 36, defines an L-shaped opening in the slider 14, said opening being appropriately configured and dimensioned to receive the L-shaped guide portion 26 of the guide element 16. The slot 36 is passed through by the guide element 16, in particular by the guide portion 26 thereof, in the mounted state of the slider 14, wherein said guide portion 26 passes through the slot 36 into the interior of the slider 14, which is formed by the opening 34. In the mounted state, the L-shaped guide portion 26 is oriented such that a leg of the guide portion 26 extends vertically through the slot 36 and a further leg is arranged horizontally in the opening 34. The horizontal region of the guide portion 26 therefore engages behind an upper part of the slider 14, which bounds the opening 34 therein at the top. Since the horizontal portion of the guide portion 26 is longer than the opening width of the upwardly open slot 36 in the slider 14, the slider 14 and guide element 16 can only be released from one another when the slider is moved so far along the guide element 16 that the guide element 16 can be pulled out of the slider 14 toward the front or rear. In the embodiment in FIGS. 1 to 4, the slider 14 has a first portion 28 and a second portion 30, wherein both portions have the explained L shape as the opening. In principle, a slider according to the invention can also have only one such portion or more than two such portions, however. In the illustrated embodiment of the invention, a fastening region 32 is arranged between the two portions 28 and 30, said fastening region 32 serving to fasten the slider 14 to the tilt lever 24. To this end, the slider 14 has a bore in the fastening region 32, through which a fastening pin 38 passes at least partially through the fastening region 32. The slider 14 is arranged on this fastening pin 38 so as to be pivotable about a longitudinal axis of the fastening pin 38. The longitudinal axis of the fastening pin 38 is in this case oriented in a direction transversely to the vehicle longitudinal axis. In order that the slider 14 is prevented from being released from the fastening pin 38, provision is made of a securing means which is preferably embodied as a wobble-type securing means of the fastening pin 38. "Wobble-type securing" should be understood as meaning a plastic deformation of one end of the fastening pin 38 (also known as "bracing"), wherein a nonreleasable connection between the slider 14 and fastening pin 38 is achieved by this deformation. The fastening pin 38 is in turn fastened to the tilt lever 24 and is likewise pivoted when this tilt lever 24 is pivoted. The fastening pin 38 is embodied so as to be rotatable relative to the tilt lever 24 or to the slider 14. In the exemplary embodiment in FIG. 3, the fastening pin 38 is connected fixedly, i.e. not rotatably, to the tilt lever 24, but the slider 14 can rotate about the fastening pin 38. Thus, the slider 14 can follow a curve of the guide element 16 or of the guide portion 26 thereof by rotating relative to the tilt lever 24. Therefore, the guide element 16 can, as illustrated in FIG. 1d, extend upward for example in a rear region of the cover 12 and tend to be oriented horizontally in a central region of the cover 12. The slider 14 is in this case pivoted in an appropriate manner relative to the tilt lever 24 such that it can follow the profile of the guide element 16.

The slider 14 can furthermore adapt to provided or production-related tolerances (for example of the guide element 16) via resiliently elastic deformation in addition to pivoting.

As already explained, these elastic properties are achieved by the construction of the slider 14 from two components, specifically from a metal region or a plastics region 40. In FIGS. 1 to 3 that have been explained thus far, only the external plastics region 40, by means of which an internal metal region is enclosed, preferably overmolded, can be seen. The plastics region 40 of the plastics material of the slider 14 is in this case produced, for example, from POM (polyoxymethylene) or is overmolded on the internal metal region.

The internal metal region 42 of the slider 12 from FIGS. 1 to 3 is depicted in FIG. 4. Thus, FIG. 4 is an illustration of the slider 12 from FIGS. 1 to 3 in which the external plastics region 40 is illustrated in a transparent (or removed) manner. It is clear from a comparison of FIGS. 3 and 4 that the internal metal region 42 as a whole has the same basic shape as the slider 14. The slider 14 according to the exemplary embodiments in FIGS. 1 to 4 thus represents a cage-like metal region 42 which has been overmolded with the plastics material of the plastics region 40 in a manner retaining the shape thereof. Alternatively, embodiments of a slider according to the invention can also be produced in that the metal region 42 is only partially overmolded or in that not all of the elements of this slider 14 according to the invention are supported by corresponding metal inserts of the metal region 42. Thus, it is possible for example for an alternative slider to have two likewise L-shaped openings, whereas the internal metal region 42 reproduces only particular elements of the overall shape of the slider.

FIG. 5 shows the slider 14 from the preceding figures in longitudinal section. The plastics region 40 of the slider 14 has a contact region 44 which comes into contact with the guide portion 26 of the guide element 16. This contact region 44 has bulges 46 which expand the opening 34, through which the guide portion 26 is guided through the slider 14, on the inlet side, that is to say in the region of the respective front end face 48 and rear end faces 50 in the direction of travel. These bulges 46 allow the slider 14 to be guided about an illustrated curvature of the guide element 16 or make this easier.

The invention claimed is:

1. A vehicle having a slider for guiding a displaceable element of the vehicle relative to a body of the vehicle, wherein the slider is arranged so as to be movable along a guide element, and has a plastics region and a metal region,
   wherein the slider is embodied in one piece, and the metal region is at least partially overmolded with the plastics region, and the slider is configured such that at least one portion of the slider engages at least partially around the guide element; and
   wherein the metal region is a spring-steel insert which is overmolded entirely with the plastics region.

2. The vehicle as claimed in claim 1, wherein the guide element is oriented in a direction substantially parallel to the vehicle longitudinal axis and has a guide portion which has a cross section transversely to the vehicle longitudinal axis, wherein the slider has a through-opening which is configured to receive the cross section of the guide portion such that the slider is displaceable along the guide element in the direction parallel to the vehicle longitudinal axis and relative to the guide portion.

3. The vehicle as claimed in claim 2, wherein the cross section of the guide portion is configured in an L-shaped or U-shaped manner, and the opening in the slider is configured in an L-shaped or U-shaped manner.

4. The vehicle as claimed in claim 3, wherein the plastics region and also the metal region have an L-shaped or U-shaped through-opening.

5. The vehicle as claimed in claim 1, wherein the at least one portion encloses an opening transversely to the vehicle longitudinal axis except for a slot, wherein the opening and the slot are configured to receive a guide portion of the guide element in that the guide portion can engage in the opening through the slot, wherein the engagement is secured against releasing in that the guide portion is wider than the slot in the region of the opening such that the slider is displaceable along the guide element in the direction parallel to the vehicle longitudinal axis and relative to the guide portion.

6. The vehicle as claimed in claim 5, wherein the slider has two such portions, which are arranged in succession in the direction of the vehicle longitudinal axis, and a fastening region arranged between these portions, a fastening pin being arranged at said fastening region in order to mount the slider in a pivotable manner about a first rotation axis which is oriented transversely to the vehicle longitudinal axis.

7. The vehicle as claimed in claim 6, wherein the fastening pin is plugged through an opening in the fastening region and is secured against releasing of the fastening in that a securing means preferably in the form of a wobble-type securing means is arranged behind the opening on the plugged-through end of the fastening pin.

8. A vehicle having a slider for guiding a displaceable element of the vehicle relative to a body of the vehicle, wherein the slider is arranged so as to be movable along a guide element, and has a plastics region and a metal region,
wherein the slider is embodied in one piece, and the metal region is at least partially overmolded with the plastics region, and the slider is configured such that at least one portion of the slider engages at least partially around the guide element;
wherein the metal region is a spring-steel insert which is at least partially overmolded with the plastics region; and
wherein the displaceable element is a cover for optionally opening and closing an opening in a roof of the vehicle, the guide element is arranged on the cover, the slider is arranged on a tilt lever which can be pivoted about a second rotation axis that is oriented transversely to the vehicle longitudinal axis, and the cover is lifted in the region of a cover rear edge by deployment of the tilt lever during a movement of the cover toward the rear over a roof surface of the roof, wherein, during the movement of the cover relative to the roof opening, the guide element is moved relative to the slider and is guided by the latter.

9. A slider for guiding a displaceable element of a vehicle relative to a body of the vehicle, wherein the slider has a plastics region and a metal region,
wherein the slider is embodied in one piece, and the metal region is at least partially overmolded with the plastics region, and the slider is configured such that at least one portion of the slider can engage at least partially around a guide element of the vehicle;
wherein the metal region is configured as a spring-steel insert which is at least partially overmolded with the plastics region; and
wherein the at least one portion encloses an opening transversely to a longitudinal axis of the slider except for a slot, wherein the opening and the slot are configured to receive a guide portion of a guide element in that the guide portion can engage in the opening through the slot, wherein the engagement is secured against releasing in that the provided guide portion is wider than the slot in the region of the opening such that the slider is displaceable along the guide element and relative to the guide portion and guides the latter.

10. The vehicle as claimed in claim 9, wherein a cross section of the guide portion is configured in an L-shaped or U-shaped manner, and the opening in the slider is configured in an L-shaped or U-shaped manner.

11. The slider as claimed in claim 10, wherein the plastics region and also the metal region have the L-shaped or U-shaped through-opening.

12. The slider as claimed in claim 9, wherein the slider has two such portions, which are arranged in succession in a longitudinal direction of the slider, and a fastening region arranged between these portions, a fastening pin being arranged at said fastening region in order to mount the slider in a pivotable manner about a first rotation axis.

13. The slider as claimed in claim 9, wherein the plastics region has bulges in a contact region that is adapted to engagement with the guide element, said bulges expanding the opening, through which the guide portion is guided through the slider, in the region of a respective front end face and rear end faces in the direction of travel.

* * * * *